(12) United States Patent
Choi et al.

(10) Patent No.: US 12,236,057 B2
(45) Date of Patent: Feb. 25, 2025

(54) AUDIO PLAYBACK AND SCREEN DISPLAY METHOD AND DEVICE THEREFOR

(71) Applicant: Samsung Electronics Co., Ltd., Suwon-si (KR)

(72) Inventors: Ikhee Choi, Suwon-si (KR); Bongje Cho, Suwon-si (KR); Eunji Choi, Suwon-si (KR); Yeunwook Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/164,644

(22) Filed: Feb. 6, 2023

(65) Prior Publication Data
US 2023/0244351 A1   Aug. 3, 2023

Related U.S. Application Data

(63) Continuation of application No. PCT/KR2021/009426, filed on Jul. 21, 2021.

(30) Foreign Application Priority Data

Aug. 4, 2020   (KR) .................. 10-2020-0097638

(51) Int. Cl.
*G06F 3/0481*   (2022.01)
*G06F 3/0488*   (2022.01)
*G06F 3/16*   (2006.01)

(52) U.S. Cl.
CPC .......... *G06F 3/0481* (2013.01); *G06F 3/0488* (2013.01); *G06F 3/162* (2013.01)

(58) Field of Classification Search
CPC ....... G06F 3/0481; G06F 3/0488; G06F 3/162
See application file for complete search history.

(56) References Cited

U.S. PATENT DOCUMENTS 5,970,455 A  * 10/1999  Wilcox .................. G11B 27/34
                                                           704/278
6,802,041 B1 * 10/2004  Rehm ..................... G06F 16/48
                                                           715/728
(Continued)

FOREIGN PATENT DOCUMENTS

JP   2001-154664 A   6/2001
JP   2014-215334 A   11/2014
(Continued)

OTHER PUBLICATIONS

International Search Report mailed Nov. 4, 2021 for PCT/KR2021/009426.

*Primary Examiner* — Tadesse Hailu
(74) *Attorney, Agent, or Firm* — CANTOR COLBURN LLP

(57) ABSTRACT

An electronic device includes: a speaker; a touch display; a processor operatively coupled to the speaker and the touch display. The processor is configured to execute an application; in response to the execution of the application, display a first screen corresponding to the application through the touch display; acquire an input to play back audio data of the application while the first screen is displayed; in response to the acquisition of the input, output audio corresponding to the audio data through the speaker; determine whether an object associated with the outputted audio exists; determine whether the object is displayed in the first screen based on the determination that the object associated with the outputted audio exists; and when the object is not displayed in the first screen, perform auto scroll so that the object is displayed through the first screen while the audio is output.

16 Claims, 14 Drawing Sheets

(56) References Cited

U.S. PATENT DOCUMENTS

| | | | | |
|---|---|---|---|---|
| 6,961,895 | B1* | 11/2005 | Beran | G09B 5/06 |
| | | | | 715/203 |
| 7,774,799 | B1* | 8/2010 | Sellers | G09B 5/00 |
| | | | | 719/329 |
| 8,433,431 | B1 | 4/2013 | Master et al. | |
| 8,548,618 | B1* | 10/2013 | Story, Jr. | H04N 21/439 |
| | | | | 700/94 |
| 9,176,658 | B1* | 11/2015 | Latin-Stoermer | |
| | | | | G06F 3/04847 |
| 10,007,403 | B2 | 6/2018 | Cho | |
| 10,567,577 | B2 | 2/2020 | Hara | |
| 11,446,548 | B2* | 9/2022 | Devine | G16H 40/63 |
| 11,715,485 | B2* | 8/2023 | Park | G06N 3/08 |
| | | | | 704/200 |
| 11,836,180 | B2* | 12/2023 | Kikin-Gil | G06F 3/167 |
| 2002/0099552 | A1* | 7/2002 | Rubin | G09F 27/00 |
| | | | | 704/270 |
| 2004/0049388 | A1* | 3/2004 | Roth | G10L 15/19 |
| | | | | 704/251 |
| 2005/0142528 | A1* | 6/2005 | Veselova | G09B 5/00 |
| | | | | 434/307 R |
| 2009/0021494 | A1* | 1/2009 | Marggraff | G06F 3/0488 |
| | | | | 345/179 |
| 2010/0231537 | A1* | 9/2010 | Pisula | G11B 27/34 |
| | | | | 345/173 |
| 2012/0047437 | A1 | 2/2012 | Chan | |
| 2013/0297308 | A1* | 11/2013 | Koo | G06F 3/167 |
| | | | | 704/235 |
| 2013/0311178 | A1* | 11/2013 | Lee | G06F 3/04883 |
| | | | | 704/235 |
| 2014/0089805 | A1* | 3/2014 | Song | G06Q 10/109 |
| | | | | 715/727 |
| 2014/0108014 | A1 | 4/2014 | Tanaka et al. | |
| 2014/0120987 | A1* | 5/2014 | Kim | H04M 1/7243 |
| | | | | 455/563 |
| 2014/0201637 | A1* | 7/2014 | Na | H04N 21/440236 |
| | | | | 715/719 |
| 2014/0361983 | A1* | 12/2014 | Dolfing | G06V 30/32 |
| | | | | 345/156 |
| 2014/0366709 | A1* | 12/2014 | Uemura | H04N 21/47217 |
| | | | | 84/603 |
| 2015/0019969 | A1* | 1/2015 | Lee | G06F 16/7844 |
| | | | | 715/719 |
| 2015/0234564 | A1* | 8/2015 | Snibbe | G06T 11/60 |
| | | | | 715/716 |
| 2015/0234567 | A1* | 8/2015 | Wakatsuki | G06F 3/04842 |
| | | | | 715/852 |
| 2015/0277732 | A1* | 10/2015 | Billgren | G06F 3/0488 |
| | | | | 715/716 |
| 2016/0011847 | A1* | 1/2016 | Choe | G06F 3/038 |
| | | | | 715/716 |
| 2016/0110035 | A1* | 4/2016 | Kim | G06F 3/0481 |
| | | | | 715/765 |
| 2016/0124634 | A1 | 5/2016 | Sung | |
| 2018/0158365 | A1* | 6/2018 | Roche | G09B 5/067 |
| 2020/0196006 | A1* | 6/2020 | Boudin | G06F 3/165 |
| 2020/0379715 | A1* | 12/2020 | Won | G06F 3/04883 |
| 2021/0335381 | A1* | 10/2021 | Park | G10L 15/22 |
| 2022/0269724 | A1* | 8/2022 | Gao | G06F 16/685 |

FOREIGN PATENT DOCUMENTS

| | | |
|---|---|---|
| JP | 5915118 B2 | 5/2016 |
| JP | 6244647 B2 | 12/2017 |
| KR | 10-2000-0056059 A | 9/2000 |
| KR | 10-2006-0116945 A | 11/2006 |
| KR | 10-2013-0100586 A | 9/2013 |
| KR | 10-2013-0128381 A | 11/2013 |
| KR | 10-2014-0038640 A | 3/2014 |
| KR | 10-2016-0044688 A | 4/2016 |
| KR | 10-2018-0098175 A | 9/2018 |

\* cited by examiner

AUDIO PLAYBACK AND SCREEN DISPLAY METHOD AND DEVICE THEREFOR

TECHNICAL FIELD

Various embodiments disclosed herein relate to an electronic device having a speaker and a display and, more particularly, a method for displaying a screen while playing audio by an electronic device and a device therefor.

BACKGROUND ART

An electronic device (for example, smartphone) may provide various functions including audio input and playback functions, and object input and playback functions. For example, the electronic device may use an input device (for example, microphone, touch display) so as to acquire an audio input and a handwriting input.

DISCLOSURE OF INVENTION

Technical Problem

The electronic device may use an input device so as to display content corresponding to a handwriting input while outputting audio corresponding to an audio input. For example, the electronic device may independently perform an audio input and a handwriting input through the input device, and may independently output audio corresponding to the audio input and content corresponding to the handwriting input. As the electronic device performs operations corresponding to output of the audio and display of the content without a correlation, the user may experience a limited display function.

Technical problems to be solved by embodiments disclosed herein are not limited to the above-mentioned technical problems, and other technical problems not mentioned herein will be clearly understood from the following description by those skilled in the art to which the disclosure pertains.

Technical Solution

According to various embodiments disclosed herein, audio corresponding to an audio input and content corresponding to a handwriting input may be displayed (outputted) such that there is a correlation therebetween, thereby improving the usability of the electronic device.

In addition, according to various embodiments disclosed herein, when performing a handwriting input and an audio input related to multiple pages, content related to the audio may be automatically displayed (outputted) and/or a scroll operation may be provided.

Various embodiments disclosed herein may provide a device, a method, etc. for solving the above-mentioned problems.

An electronic device according to various embodiments of the disclosure includes: a speaker, a touch display, and a processor operatively connected to the speaker and the touch display, where the processor is configured to execute an application, display a first screen corresponding to the application through the touch display in response to the execution of the application, acquire a first input for playing audio data of the application while the first screen is displayed, output audio corresponding to the audio data through the speaker in response to the acquisition of the first input, determine whether an object associated with the outputted audio exists, determine whether the object is displayed in the first screen based on the determination that the object associated with the outputted audio exists, and perform auto scroll, when the object is not displayed in the first screen, such that the object is displayed through the first screen while the audio is outputted.

An electronic device according to various embodiments of the disclosure includes: a microphone, a touch display, and a processor operatively connected to the microphone and the touch display, where the processor is configured to execute an application, display a first screen corresponding to the application through the touch display in response to the execution of the application, acquire audio data corresponding to audio acquired through the microphone while the first screen is displayed, acquire object data corresponding to an object mapped to an input point-in-time of the acquired audio through the touch display while the first screen is displayed, identify an event for ending the acquisition of the audio data and the object data, and generate first playback data including the audio data and the object data mapped to the input point-in-time of the audio data in response to identifying the event for ending the acquisition.

A method for operating an electronic device according to various embodiments includes: executing an application, displaying a first screen corresponding to the application through a touch display in response to the execution of the application, acquiring a first input for playing audio data of the application while the first screen is displayed, outputting audio corresponding to the audio data through a speaker in response to the acquisition of the first input, determining whether an object associated with the outputted audio exists, determining whether the object is displayed in the first screen based on the determination that the object associated with the outputted audio exists, and performing auto scroll, when the object is not displayed in the first screen, such that the object is displayed through the first screen while the audio is outputted.

A method for operating an electronic device according to various embodiments may include executing an application, displaying a first screen corresponding to the application through a touch display in response to execution of the application, acquiring audio data corresponding to audio acquired through a microphone while the first screen is displayed, acquiring object data corresponding to an object mapped to an input point-in-time of the acquired audio through the touch display while the first screen is displayed, identifying an event for ending acquisition of the audio and the object, and generating playback data including the audio data and the object data mapped to an input point-in-time of the audio data in response to identifying the event for ending acquisition.

Advantageous Effects of Invention

According to various embodiments disclosed herein, an electronic device may output audio, and may display content mapped to a playback point-in-time of the outputted audio, thereby performing an audio output operation and a content display operation, which are correlated. For example, while outputting audio, the electronic device may determine content corresponding to the playback point-in-time at which the audio is outputted, thereby displaying the content. As the electronic device provides the above-mentioned function, the user can experience various display functions.

Various other advantageous effects identified explicitly or implicitly through the disclosure may be provided.

BRIEF DESCRIPTION OF DRAWINGS

In connection with description of the drawings, identical or similar components may be given identical or similar reference numerals.

BEST MODE FOR CARRYING OUT THE INVENTION

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents.

Figure 1:
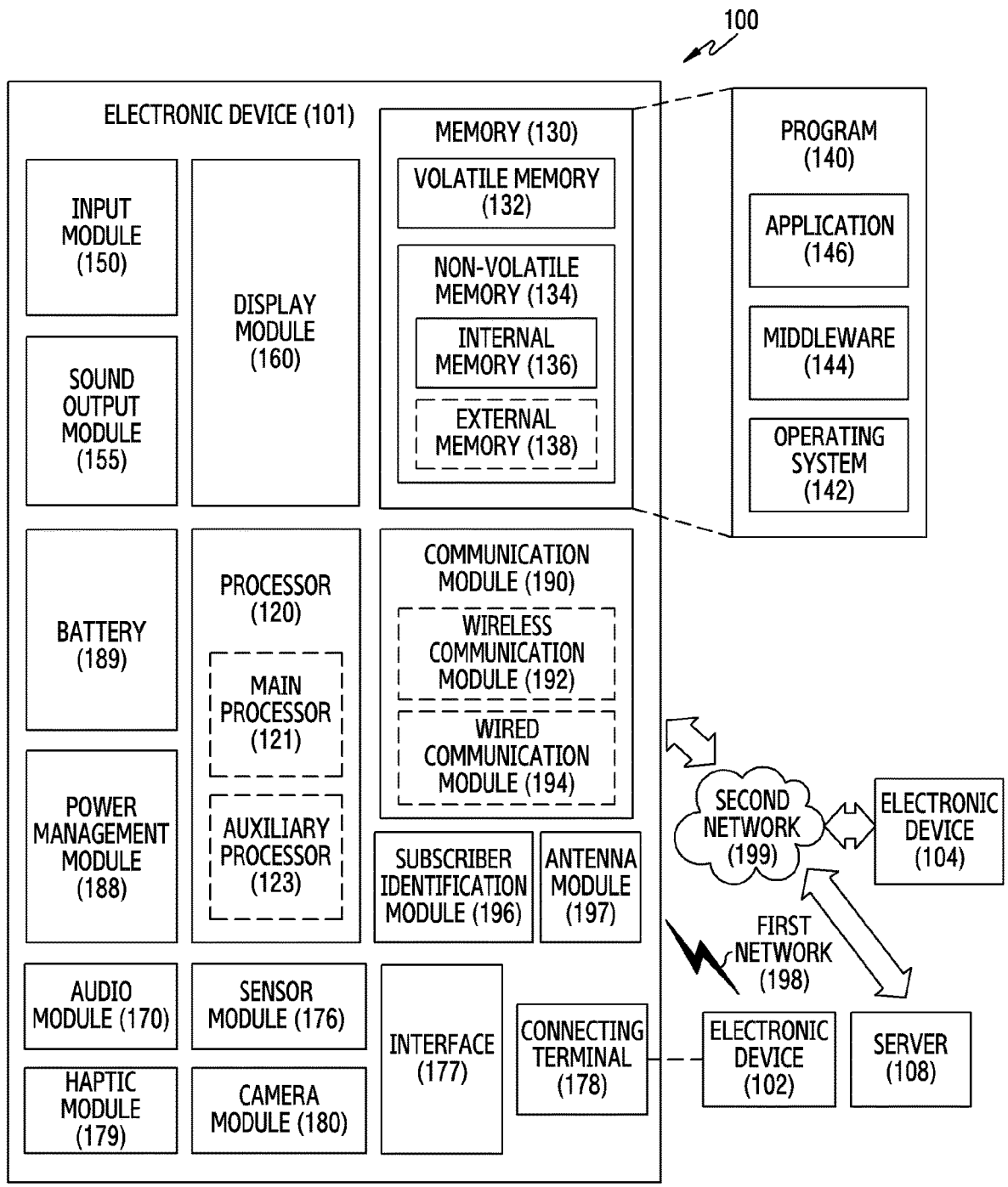
FIG. 1 is a block diagram of an electronic device inside a network environment according to an embodiment.

FIG. 1 is a block diagram of an electronic device 101 inside a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
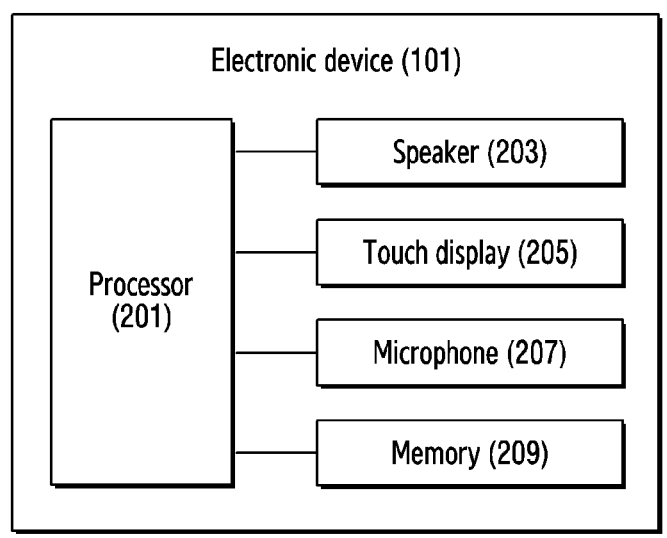
FIG. 2 is a block diagram of an electronic device according to an embodiment.

FIG. 2 is a block diagram of an electronic device 101 according to an embodiment.

Referring to FIG. 2, the electronic device 101 may include a processor 201, a speaker 203, a touch display 205, a microphone 207, and a memory 209. Modules included in the electronic device 101 may be understood as hardware modules (for example, circuits). Components included in the electronic device 101 may not be limited to the components illustrated in FIG. 2 (for example, processor 201, speaker 203, touch display 205, microphone 207, and memory 209). The components of the electronic device 101 illustrated in FIG. 2 may be replaced with other components, or additional components may be added to the electronic device 101. For example, at least a part of the configuration of the electronic device 101 in FIG. 1 may be applied to the electronic device 101 in FIG. 2.

According to an embodiment, the processor 201 may execute commands (for example, instructions) stored in the memory 209 so as to control operations of the components of the electronic device 101 (for example, processor 201, speaker 203, touch display 205, microphone 207, and memory 209). The processor 201 may be connected to the speaker 203, the touch display 205, the microphone 207, and the memory 209 electrically and/or operatively. The processor 201 may execute software so as to control at least one other component (for example, speaker 203, touch display 205, microphone 207, and memory 209) connected to the processor 201. The processor 201 may acquire a command from components included in the electronic device 101, may interpret the acquired command, and may process and/or operate various pieces of data according to the interpreted command.

According to an embodiment, the speaker 203 may output audio corresponding to audio data. The electronic device 101 may output audio corresponding to audio data through the speaker 203. The electronic device 101 may output audio corresponding to audio data stored in the electronic device 101 or audio data acquired from an external device through the speaker 203.

According to an embodiment, the touch display 205 may visually display content. For example, the electronic device 101 may display at least one of an object, an image, or a video through the touch display 205. According to an embodiment, the touch display 205 may include a touch sensor. The electronic device 101 may acquire a touch input through the touch display 205. For example, the electronic device 101 may acquire a touch input of a user who inputs an object through the touch display 205. In addition, according to an embodiment, a pressure sensor configured to measure the intensity of a force generated by a touch input may be included. In an embodiment, the touch display 205 may include a display, a hologram device, or a projector and a control circuit for controlling the corresponding device.

According to an embodiment, the touch display 205 may include a display disposed to be able to slide, thereby providing a screen (for example, display screen). For example, the display area of the electronic device 101 may be an area exposed visually such that images can be outputted, and the electronic device 101 may adjust the display area according to movements of a sliding plate (not illustrated) or movements of the display. For example, a rollable-type electronic device may be included, which is configured such that at least a part (for example, housing) of the electronic device 101 operates to be able to at least partially slide, thereby accomplishing selective expansion of the display area. For example, the touch display 205 may also be referred to as a slide-out display or an expandable display. For example, the touch display 205 may change the kind of content provided through the display screen according to a movement (for example, expanded state or reduced state) of the display. For example, first content (for example, object 901, 902 in FIG. 9) may be displayed in a first display area in the reduced state, and first content (for example, object 901, 902 in FIG. 9) and second content (for example, marking 903 related to audio data in FIG. 9) may be separately displayed in a first display area and in a second display area, respectively, in the expanded state. According to an embodiment, the microphone 207 may acquire audio. For example, the microphone 207 may acquire audio corresponding to the user's voice. The electronic device 101 may acquire audio data corresponding to audio acquired through the microphone 207. For example, the electronic device 101 may acquire audio data corresponding to the user's voice acquired through the microphone 207. According to an embodiment, the number of microphones 207 included in the electronic device 101 may not be limited. For example, the electronic device 101 may include multiple microphones 207.

According to an embodiment, the electronic device 101 may, among the multiple microphones 207, distinguish and acquire audio data according to the position in which corresponding multiple microphones 207 are included (disposed) in the electronic device 101. For example, multiple microphones 207 may be disposed at the upper and lower ends of the electronic device 101, data acquired through a first microphone disposed at the upper end may be distinguished and stored as first audio data (for example, external audio data), and data acquired through a second microphone disposed at the lower end may be distinguished and stored as second audio data (for example, user audio data).

According to an embodiment, the electronic device 101 may use the touch display 205 so as to display an image (or icon) distinguished so as to correspond to audio data acquired through the first microphone and the second microphone. For example, the electronic device 101 may store data including audio data and a handwriting input, and may display at least one object (for example, object 901, 902 in FIG. 9) corresponding to the stored data. The electronic device 101 may mark an object 901 including multiple pieces of audio data acquired through multiple microphones, among the at least one object 901, 902, so as to be distinguished from the other object 902. For example, the electronic device 101 may provide different markings (for example, microphone markings) so as to distinguish first audio data (for example, external audio data) over second audio data (for example, user audio data). In addition, the electronic device 101 may change, based on a user input regarding each distinguished marking (for example, microphone marking), an area including an object related to audio data (for example, first audio data, second audio data) (for example, operation 403 in FIG. 4). For example, when second audio data among first audio data and second audio data is deactivated (for example, not played back) based on a user input, the electronic device 101 may deactivate (for example, change transparency of) an area including an object mapped in relation to the second audio data. For example, the electronic device 101 may distinguish and display the visual effect and/or attribute (for example, thickness, color, or saturation of text) of an object mapped in relation to first audio data and an object mapped in relation to second audio data.

According to an embodiment, the memory 209 may store various pieces of data used by components of the electronic device 101 (for example, processor 201, speaker 203, touch display 205, and microphone 207) temporarily or non-temporarily. For example, the memory 209 may store data corresponding to a touch input acquired through the touch display 205.

Figure 3:
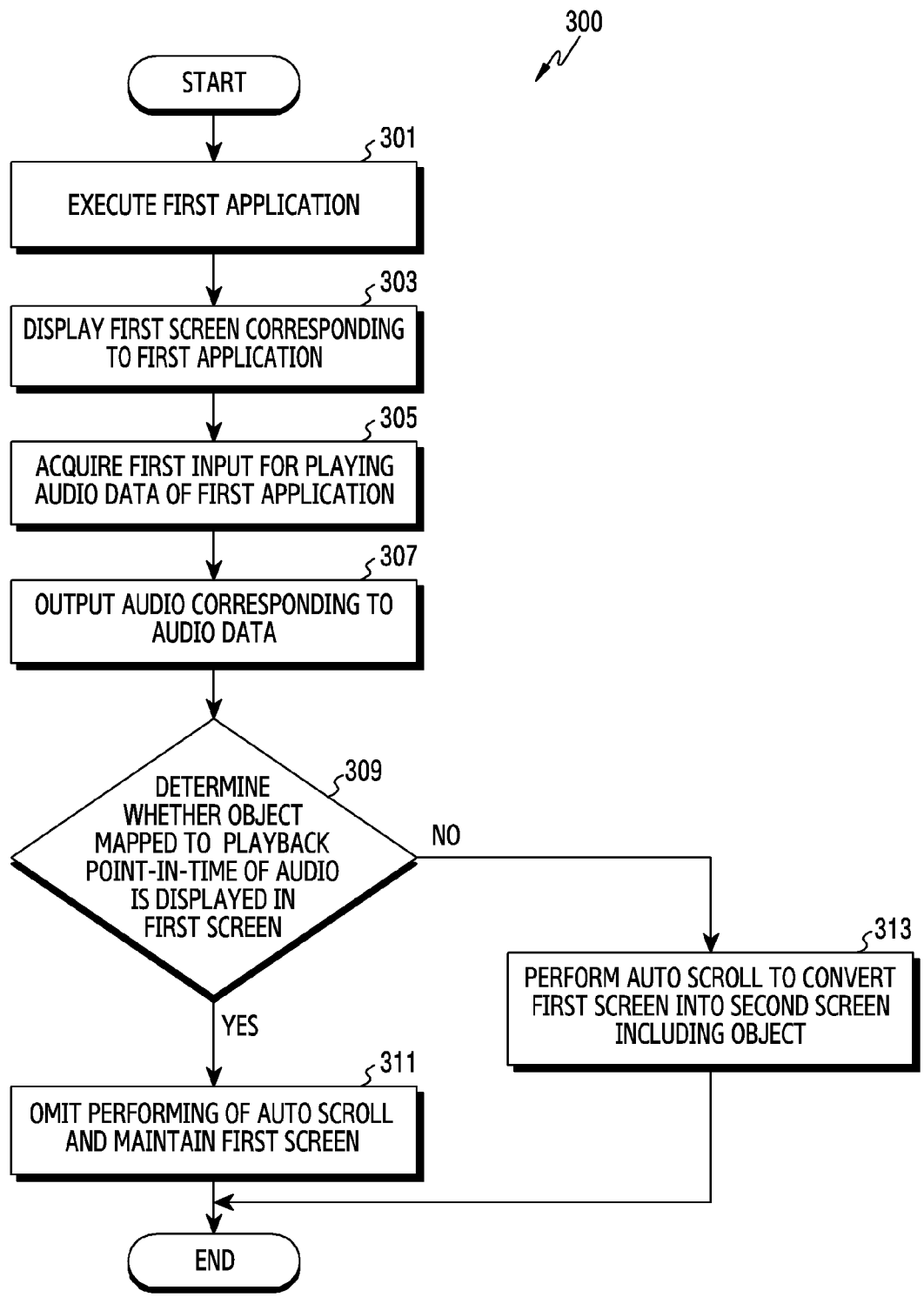
FIG. 3 is a flowchart of operations in which an electronic device according to an embodiment displays an object mapped to an audio playback point-in-time through a first screen.

FIG. 3 is a flowchart 300 of operations in which an electronic device 101 according to an embodiment displays an object mapped to an audio playback point-in-time through a first screen.

A series of operations described below may be performed simultaneously by the electronic device 101 or performed in a changed order, and some operations may be omitted or added.

In operation 301, the electronic device 101 may execute a first application. The first application may be a handwriting software application (or note application), and is not limited to the terminology. For another example, the first application may be understood as a software application including a function for playing audio corresponding to audio data and displaying an object associated with the audio. For still another example, the first application may be understood as a software application including a function for displaying, while audio is played, an object associated with a playback point-in-time of the audio. The object may include at least one of a text, a stroke, an image, a text box, or a web card.

According to an embodiment, the electronic device 101 may acquire a user input for executing the first application. In response to acquisition of the user input, the electronic device 101 may execute the first application. The user input may include at least one of a button input, a touch input, a gesture input, a drag input, or a voice input. For example, the electronic device 101 may acquire the user's touch input for executing the first application through the touch display 205. In response to the acquired touch input from the user, the electronic device 101 may execute the first application. The user input is not limited to the above-mentioned examples, and may include various input methods for executing the first application.

In operation 303, in response to execution of the first application, the electronic device 101 may display a first screen corresponding to the first application. For example, the electronic device 101 may display a first screen including an area for inputting a handwriting, in response to execution of a handwriting application. For example, the UI of the first screen may be referred to FIG. 9. According to an embodiment, in response to execution of the first application, the electronic device 101 may enter an operation mode for the first application. After entering the mode for the first application, the electronic device 101 may display a preview screen (for example, UI 900 in FIG. 9) including at least one content (for example, object 901, 902 in FIG. 9) corresponding to a data file (for example, memo file) of the first application. The at least one content may include a thumbnail-type image that displays at least a part of the content. The at least one content may include a visual object (for example, marking 903 related to audio data in FIG. 9) according to characteristics of the content. For example, content (for example, object 901 in FIG. 9) including both handwriting data and audio data may include a visual object (for example, marking 903 related to audio data in FIG. 9) indicating audio. In response to acquisition of an input for selecting the at least one content, the electronic device 101 may display a screen (for example, first screen) corresponding to the at least one content. In operation 305, the electronic device 101 may acquire a first input for playing audio data of the first application. The electronic device 101 may acquire a first input for playing audio data stored through the first application. For example, the electronic device 101 may acquire a first input for playing audio data related to a class stored through a handwriting application.

According to an embodiment, the electronic device 101 may acquire a first input for playing content of the first application. Data of the content may include at least one of audio data or handwriting data. The audio data and the handwriting data may be associated based on time information. For example, a playback point-in-time at which audio corresponding to the audio is played and a handwriting corresponding to the handwriting data may be mapped.

In operation 307, in response to acquisition of the first input for playing audio data of the first application, the electronic device 101 may output audio corresponding to the audio data through the speaker 203. For example, in response to acquisition of a user input for playing content of the handwriting application, the electronic device 101 may output audio corresponding to audio data related to a class through the speaker 203.

In operation 309, the electronic device 101 may determine whether an object mapped to the playback point-in-time of the audio is displayed in the first screen currently displayed on the display. According to an embodiment, the electronic device 101 may identify whether an object associated with the audio exists. When the object exists, the electronic device 101 may determine the position of the identified object. Based on the position of the identified object, the electronic device 101 may determine whether the object is displayed in the first screen. The first screen may be the entire area or partial area (for example, area in which text is displayed) of the current screen displayed in response to execution of the first application. For example, the electronic device 101 may identify whether a handwriting mapped to a playback point-in-time (for example, a point-in-time of three minutes that lapses from the starting time of the audio) of the audio exists. When the handwriting exists, the electronic device 101 may determine the position of the identified handwriting. Based on the determined position, the electronic device 101 may determine whether the handwriting displayed in the first screen.

According to an embodiment, the electronic device 101 may display an object mapped to a playback point-in-time of the audio on the first screen or may display the object after changing the attribute (for example, thickness, color, or saturation of text) of the object. For example, the electronic device 101 may change the color of the text mapped to a playback point-in-time of the audio from a vague color to a dark color and then display the color text. According to an embodiment, when the object is displayed in the first screen, the electronic device 101 may perform operation 311 and, when the object is not displayed in the first screen, the electronic device 101 may perform operation 313.

In operation 311, when an object mapped to a playback point-in-time of the audio is displayed in the first screen, the electronic device 101 may omit auto scroll regarding the object. For example, when audio related to a class is being output, and if a handwriting mapped to a playback point-in-time of the audio is displayed in the first screen, the electronic device 101 may omit auto scroll regarding the handwriting and may maintain the first screen.

In operation 313, the electronic device 101 may perform auto scroll such that the first screen is changed to a second screen including an identified object. The first screen and the second screen may be understood as screens displayed in response to selection of an object corresponding to identical data (for example, identical document file) stored in the first application. The first screen and the second screen may be at least partially overlap or may not overlap. In the process of changing from the first screen to the second screen through the auto scroll, the first screen may be moved while being automatically scrolled upwards or downwards. The auto scroll may be understood as a function for performing scroll automatically such that the screen displayed by the electronic device 101 is changed. For example, when an object mapped to an audio playback point-in-time is not displayed on the first screen, the electronic device 101 may change the position of the area displayed on the touch display 205 to a second screen including the object, through auto scroll. For example, when a screen including an object mapped to an audio playback point-in-time is positioned below the screen currently displayed on the display, the electronic device 101 may move the screen currently displayed on the display upwards through auto scroll such that the screen including the object is displayed through the touch display 205 by such conversion. As another example, when a screen including an object mapped to an audio playback point-in-time is positioned above the screen currently displayed on the display, the electronic device 101 may move the screen currently displayed on the display downwards through auto scroll such that the screen including the object is displayed through the touch display 205 by such conversion.

Figure 4:
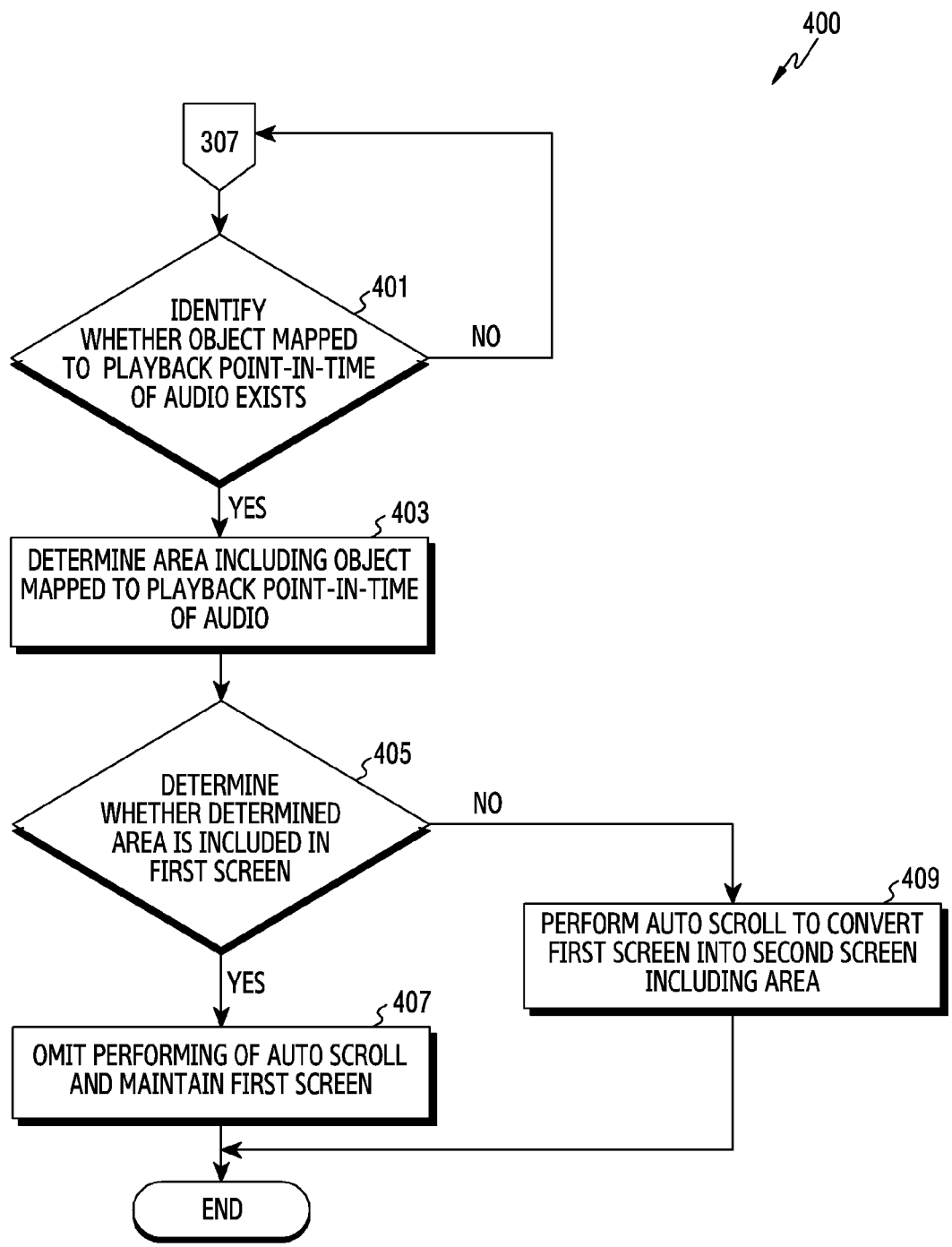
FIG. 4 is a flowchart of operations in which an electronic device according to an embodiment determines whether or not to perform auto scroll, based on an area including an object.

FIG. 4 is a flowchart 400 of operations in which an electronic device 101 according to an embodiment determines whether or not to perform auto scroll, based on an area including an object.

A series of operations described below may be performed simultaneously by the electronic device 101 or performed in a changed order, and some operations may be omitted or added.

Referring to FIG. 4, the electronic device 101 may determine an area including an object mapped to a playback point-in-time of an outputted audio. The electronic device 101 may determine whether or not to perform auto scroll, based on whether the determined area is displayed on a first screen.

In operation 401, the electronic device 101 may identify whether an object mapped to an audio playback point-in-time exists. According to an embodiment, when the identified object exists, the electronic device 101 may perform operation 403 and, when the identified object does not exist, the electronic device 101 may perform operation 307.

In operation 403, when an object mapped to the audio playback point-in-time exists, the electronic device 101 may determine an area including the object mapped to the audio playback point-in-time. The electronic device 101 may determine at least one of the position of the determined object or the position of the determined area. For example, the electronic device 101 may configure a rectangular area including the determined area and may determine the center of the rectangular area as the position of the rectangular area. The position of the area is not limited to the center of the area, and may be determined to be any point in the area. The electronic device 101 may acquire the x-coordinate and y-coordinate of the area, and may determine the position of the area, based on the acquired coordinates. The electronic device 101 may determine, based on the determined area position, whether the determined area is positioned above or below the first screen. The area may refer to an area surrounding the object. For example, the area may be a quadrangular area surrounding the object. The shape is not limited to the above-mentioned examples.

In operation 405, based on the determined area position, the electronic device 101 may determine whether the area including the object mapped to the audio playback point-in-time is included in the first screen. When the x-coordinate and y-coordinate of the determined area are included in the coordinate range of the first screen, the electronic device 101 may determine that the determined area is included in the first screen. The coordinate range may be configured with reference to coordinate (0, 0) of the left lower end of the first screen. For example, when the coordinate of the determined area is (3, 5), and when the coordinate range of the first screen is (0, 0) to (50, 70), the electronic device 101 may determine that the determined area is included in the first screen. The coordinate range is not limited to the above-mentioned examples. For another example, the coordinate range may be configured with reference to coordinate (0, 0) of the left upper end of the first screen. For still another example, when the coordinate of the determined area is (−3, −5), and when the coordinate range of the first screen is (0, 0) to (−50, −70), the electronic device 101 may determine that the determined area is included in the first screen.

According to an embodiment, when the determined area is included in the first screen, the electronic device 101 may perform operation 407 and, when the determined area is not included in the first screen, the electronic device 101 may perform operation 409.

In operation 407, when determined area is included in the first screen, the electronic device 101 may omit performing auto scroll and maintain the first screen.

In operation 409, when the determined area is not included in the first screen, the electronic device 101 may perform auto scroll such that the screen currently displayed on the display is changed from the first screen to a second screen including the determined area. For example, when the determined area is positioned above the first screen, the electronic device 101 may move the first screen downwards through auto scroll such that the screen currently displayed on the display is changed from the first screen to a second screen including the determined area. As another example, when the determined area is below above the first screen, the electronic device 101 may move the first screen upwards through auto scroll such that the screen currently displayed on the display is changed from the first screen to a second screen including the determined area. For example, it may be determined whether the determined area is positioned above or below the first screen in view of the y-coordinate of the determined area and the coordinate range of the first screen. The first screen and the second screen may be understood as screens displayed in response to selection of an object corresponding to identical data (for example, identical document file) stored in the first application. According to an embodiment, when a second area including a second object mapped to a second audio playback point-in-time is positioned below a first area including a first object mapped to a first audio playback point-in-time, the electronic device 101 may move the first screen including the first area upwards through auto scroll such that the same changes to the second screen including the second area. As another example, when a second area including a second object mapped to a second audio playback point-in-time is positioned above a first area including a first object mapped to a first audio playback point-in-time, the electronic device 101 may move the first screen including the first area downwards through auto scroll such that the same changes to the second screen including the second area. The second playback point-in-time may be understood as a point-in-time after a time lapse from the first playback point-in-time.

Figure 5:
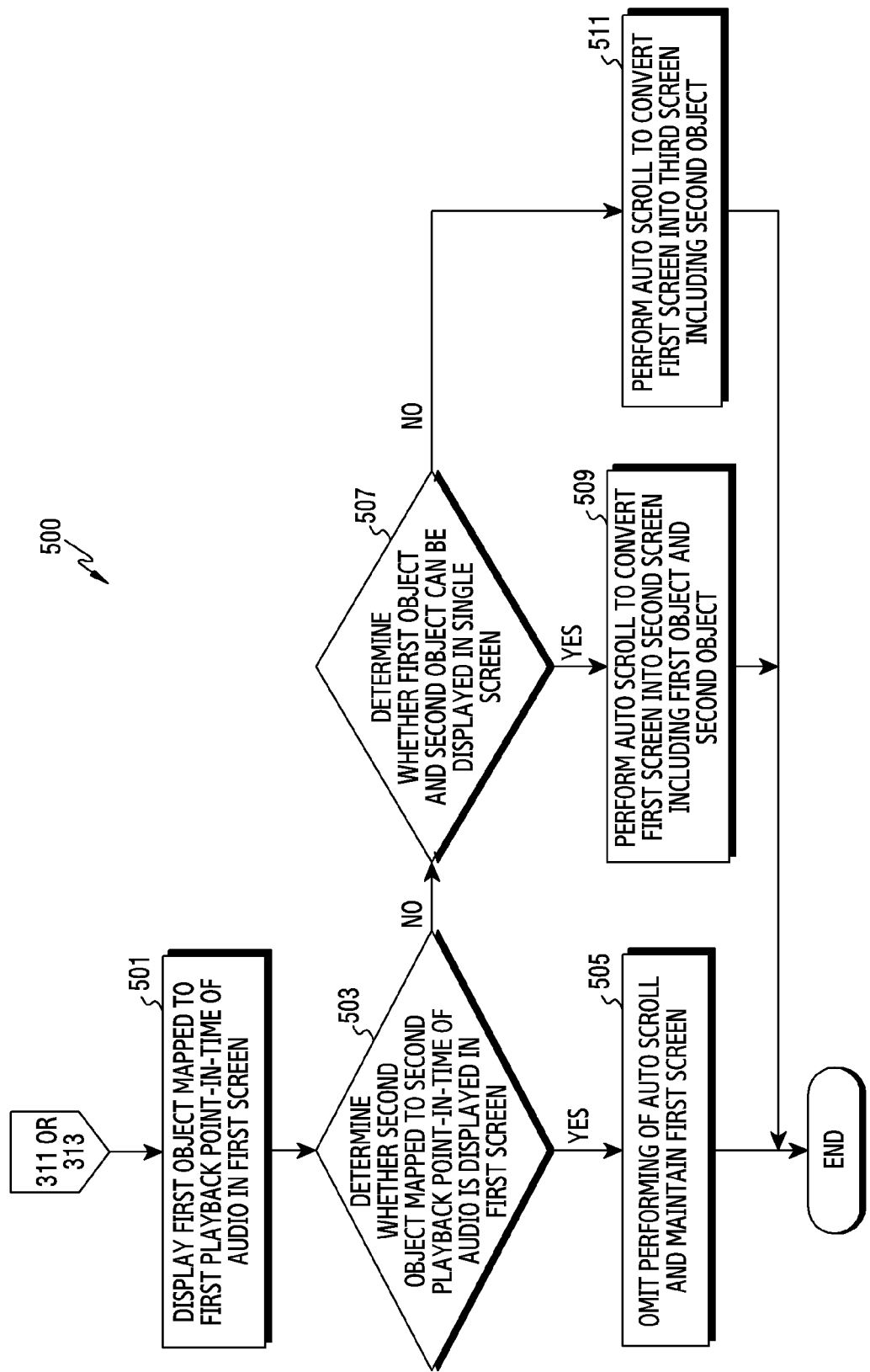
FIG. 5 is a flowchart of operations in which an electronic device according to an embodiment minimizes screen movements through auto scroll.

FIG. 5 is a flowchart 500 of operations in which an electronic device 101 according to an embodiment minimizes screen movements through auto scroll.

A series of operations described below may be performed simultaneously by the electronic device 101 or performed in a changed order, and some operations may be omitted or added.

In operation 501, the electronic device 101 may display a first object mapped to a first audio playback point-in-time in a first screen. The operation of displaying the first object in the first screen may be performed after operation 311 or 313 in FIG. 3 is performed. For example, the first object may be displayed in the first screen by performing auto scroll or without performing the auto scroll.

In operation 503, the electronic device 101 may determine whether a second object mapped to a second audio playback point-in-time is displayed in the first screen. According to an embodiment, when the second object is displayed in the first screen, the electronic device 101 may perform operation 505 and, when the second object is not displayed in the first screen, the electronic device 101 may perform operation 507.

In operation 505, when the second object is displayed in the first screen, the electronic device 101 may omit performing auto scroll such that the first screen keeps displaying the second object. The electronic device 101 may omit performing the auto scroll and may maintain the first screen.

In operation 507, when the second object is not displayed in the first screen, the electronic device 101 may determine whether the first and second objects can be displayed in a single screen. For example, when the distance between the position of a first object mapped to a first playback point-in-time of audio and the position of a second object mapped to a second playback point-in-time of the audio is less than the size of the first screen, the first and second objects may be displayed in a single screen.

According to an embodiment, when multiple objects including first and second objects can be displayed in a first screen, the electronic device 101 may display the first object in the first screen around an object (for example, second object) related to a playback point-in-time (for example, second playback point-in-time) after a time lapse. For example, the electronic device 101 may display the second object at the center of the first screen and may display the first object at the upper end of the first screen.

According to an embodiment, when the first and second objects can be displayed in a single screen, the electronic device 101 may perform operation 509 and, when the first and second objects cannot be displayed in a single screen, the electronic device 101 may perform operation 511.

In operation 509, when the first and second objects can be displayed in a single screen, the electronic device 101 may perform auto scroll such that the first screen is changed to a second screen including the first and second objects. When the first and second objects can be displayed in a single screen, the electronic device 101 may change the first screen to the second screen including the first and second objects by performing the auto scroll.

In operation 511, when the first and second objects cannot be displayed in a single screen, the electronic device 101 may perform auto scroll such that the first screen is changed to a third screen including the second object, not the first object. Operation 511 in FIG. 5 may correspond to operation 313 in FIG. 3 and operation 409 in FIG. 4.

Figure 6:
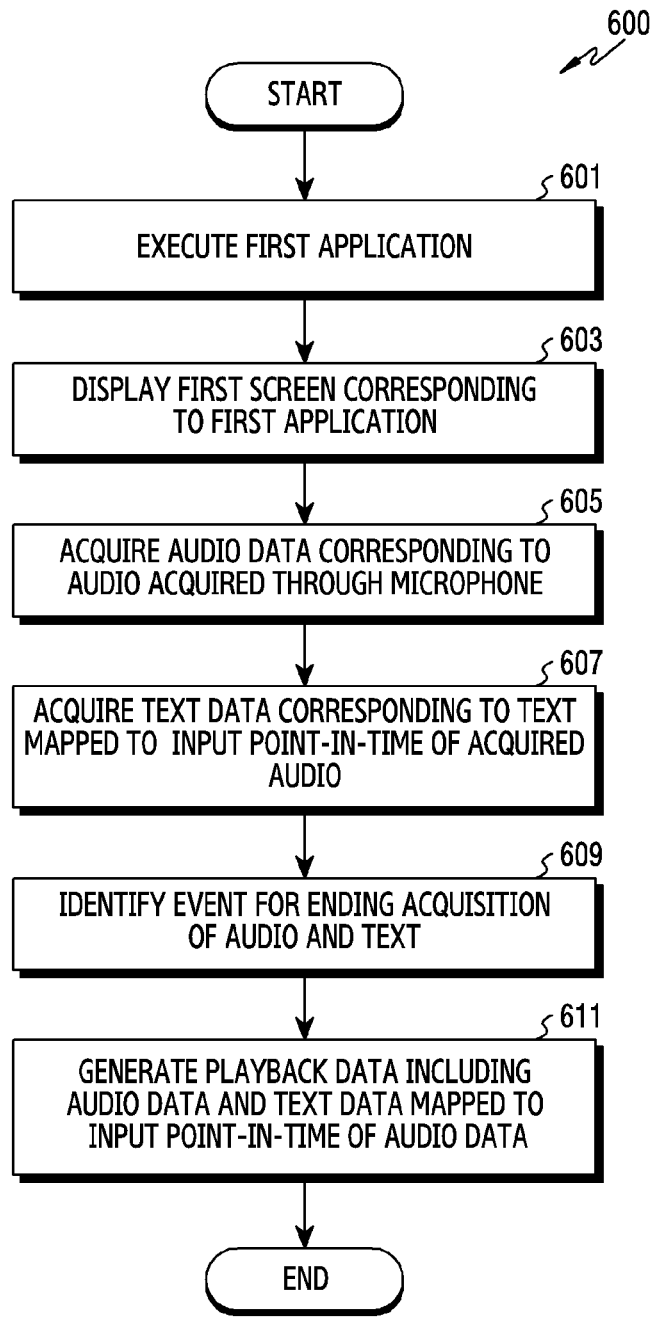
FIG. 6 is a flowchart of operations in which an electronic device according to an embodiment generates playback data.

FIG. 6 is a flowchart 600 of operations in which an electronic device 101 according to an embodiment generates playback data.

A series of operations described below may be performed simultaneously by the electronic device 101 or performed in a changed order, and some operations may be omitted or added.

In operation 601, the electronic device 101 may execute a first application. The first application may be understood as a handwriting application, and is not limited to the terminology. For another example, the first application may be understood as an application including a function for playing audio corresponding to audio data and displaying an object associated with the audio. Operation 601 in FIG. 6 may correspond to operation 301 in FIG. 3.

In operation 603, the electronic device 101 may display a first screen corresponding to the first application. Operation 603 in FIG. 6 may correspond to operation 303 in FIG. 3.

In operation 605, the electronic device 101 may acquire audio data corresponding to audio acquired through the microphone 207. While displaying the first screen, the electronic device 101 may acquire an event that starts an audio input. The event may include an input for selecting an object displayed on the first screen. In response to acquisition of the event, the electronic device 101 may acquire audio through the microphone 207. For example, in response to acquisition of the event, the electronic device 101 may acquire audio generated during a lecture through the microphone 207.

In operation 607, the electronic device 101 may acquire object data (e.g., text data) corresponding to an object mapped to an input point-in-time of the acquired audio. While the electronic device 101 acquires audio through the microphone 207, the electronic device 101 may acquire a handwriting input through the touch display 205. The acquired audio and the acquired handwriting input may be associated in relation to an input point-in-time of the acquired audio. For example, while the electronic device 101 acquires audio through the microphone 207, the electronic device 101 may acquire an object mapped to an input point-in-time (for example, a point-in-time of three minutes that lapses from the starting time of the audio) of the acquired audio through the touch display 205. The electronic device 101 may acquire object data corresponding to the acquired object.

In operation 609, the electronic device 101 may identify an event that ends acquisition of the audio and object (e.g., text). The ending event may include an input for selecting an object displayed on the first screen. In response to acquisition of an input for selecting an object displayed on the first screen, the electronic device 101 may sense an event that ends acquisition of the audio and object.

In operation 611, the electronic device 101 may generate playback data including audio data and object data mapped to an input point-in-time of the audio data. For example, while outputting audio, the electronic device 101 may generate playback data including content including an object mapped to an input point-in-time of the outputted audio. The electronic device 101 may store the generated playback data.

Figure 7:
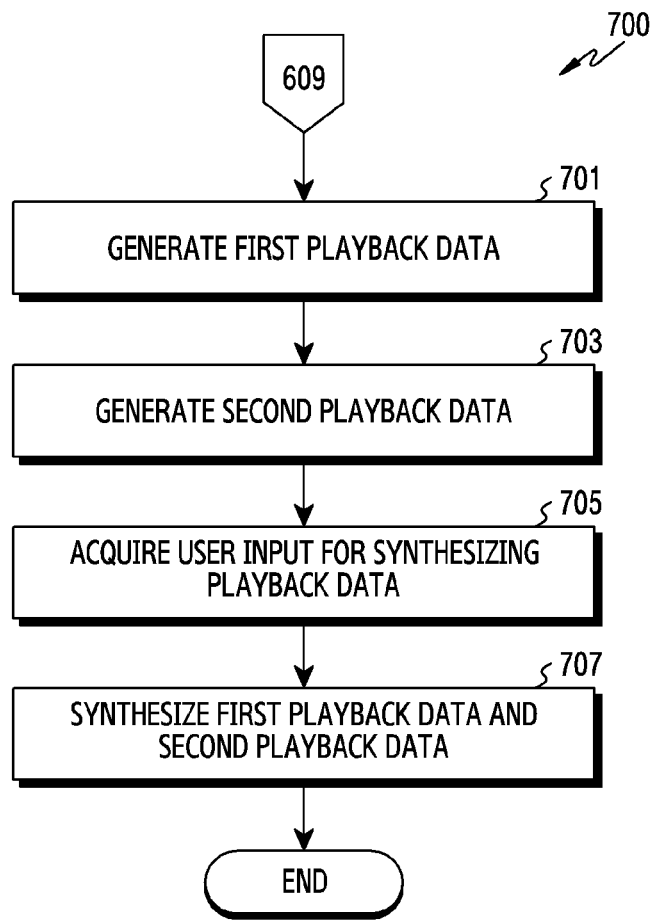
FIG. 7 is a flowchart of operations in which an electronic device according to an embodiment synthesizes playback data.

FIG. 7 is a flowchart 700 of operations in which an electronic device 101 according to an embodiment synthesizes playback data.

A series of operations described below may be performed simultaneously by the electronic device 101 or performed in a changed order, and some operations may be omitted or added.

In operation 701, the electronic device 101 may generate first playback data. In response to identifying an event that ends acquisition of audio and object inputs (operation 609 in FIG. 6), the electronic device 101 may generate first playback data including audio data and object data mapped to an input point-in-time of audio data. The electronic device 101 may store the generated first playback data. Operation 701 in FIG. 7 may correspond to operation 611 in FIG. 6.

In operation 703, the electronic device 101 may generate second playback data. The operation of generating the second playback data may be substantially identical to the operation of generating the first playback data. The first playback data may be understood as first audio and handwriting data stored in a first handwriting file of a handwriting application, and the second playback data may be understood as second audio and handwriting data stored in the first handwriting file of the first application. FIG. 7 illustrates two pieces of playback data generating operations, but is not limited thereto, and multiple pieces of playback data including third playback data may be generated.

In operation 705, the electronic device 101 may acquire a user input for synthesizing playback data. For example, when multiple pieces of playback data are stored in the first handwriting file of the handwriting application, a user input for synthesizing the multiple pieces of playback data may be acquired.

In operation 707, in response to acquiring the user input for synthesizing playback data, the electronic device 101 may synthesize first playback data and second playback data. Synthesis of pieces of playback data may refer to converting multiple pieces of playback data into a single piece of playback data. According to an embodiment, when first playback data, second playback data, and third playback data are stored in the first handwriting file of the first application, the electronic device 101 may synthesize the first playback data, the second playback data, and the third playback data.

Figures 8A, 8B:
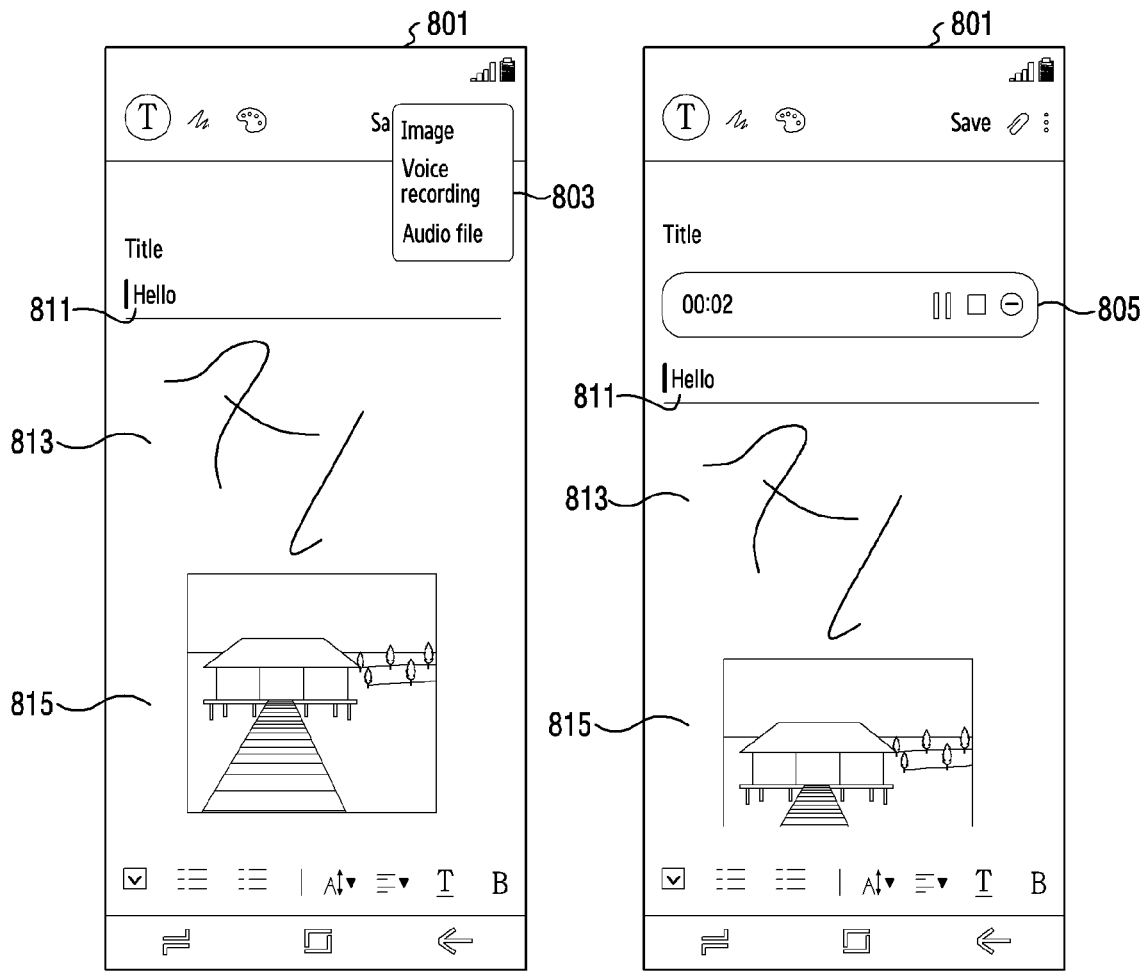
FIGS. 8A and 8B illustrate a UI of a first screen according to an embodiment.

FIGS. 8A and 8B illustrate a user interface (UI) of a first screen 801 according to an embodiment.

FIG. 8A illustrates a first screen 801 displayed in response to execution of a first application. FIG. 8B illustrates a first screen 801 displayed in response to a first input for playing audio data.

Referring to FIG. 8A and FIG. 8B, the electronic device 101 may display a first screen 801 in response to execution of a first application. For example, the electronic device 101 may display a first screen 801 including an input area for inputting content (for example, image 815, handwriting 813, or text 811) in response to execution of a handwriting application.

According to an embodiment, the first screen 801 may include a menu 803, an input area for inputting content (for example, image 815, handwriting 813, or text 811), and an object 805 related to audio playback. The menu 803 may include an image menu for adding an image to the input area, a voice recording menu for recording a voice, and an audio file menu for adding an audio file. The menu 803 may include various menus in addition to the above-mentioned menus. The electronic device 101 may acquire the user's handwriting or image through the input area. The object 805 related to audio playback may include an object for selecting a playback point-in-time (for example, two seconds) of audio data, or for stopping or pausing playback of the audio data.

Figure 9:
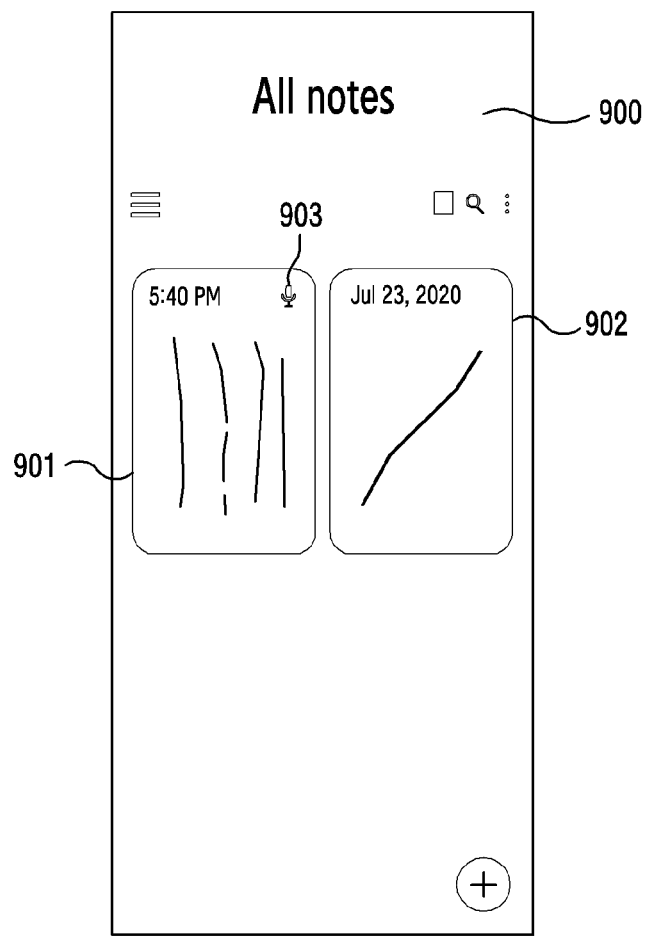
FIG. 9 illustrates a UI related to a first screen according to an embodiment.

FIG. 9 illustrates a UI 900 related to a first screen 801 according to an embodiment.

Referring to FIG. 9, in response to execution of the first application, the electronic device 101 may display a UI 900 including at least one object 901, 902 corresponding to stored data. The at least one object may include a thumbnail-type image which displays at least a part of the stored data. Based on the characteristics of the stored data, the at least one object 901, 902 may have different types. For example, when the stored data includes audio data, the at least one object 901 may include a marking 903 (for example, microphone marking) related to the audio data. In response to a user input for selecting the at least one object 901, 902, the electronic device 101 may display a first screen 801 corresponding to the at least one object 901, 902. According to an embodiment, the electronic device 101 may display the at least one object 901, 902 in various formats. For example, the electronic device 101 may display the at least one object 901, 902 in a grid, list, or simple list format. In the grid format, the object 901, 902 may be displayed in a symmetric format (for example, 2×2, 3×3) or in an asymmetric format based on the size of a thumbnail according to the size of the object 901, 902. In the list format, the object 901, 902 may be displayed so as to include a large thumbnail, the date and/or time at which the large thumbnail is generated. In the simple list format, the object 901, 902 may be displayed so as to include a small thumbnail, a title, the date and/or time at which the small thumbnail is generated. According to an embodiment, in response to acquiring an input for selecting an object from at least one object displayed in the grid format, the electronic device 101 may display a first screen 801 corresponding to the selected object.

FIG. 10A to FIG. 10D illustrate a UI related to text display using auto scroll while outputting audio according to an embodiment.

Referring to FIG. 10A to FIG. 10D, while outputting audio, the electronic device 101 may display a text mapped to a playback point-in-time of the audio through a first screen 801 by using auto scroll.

Figure 10A:
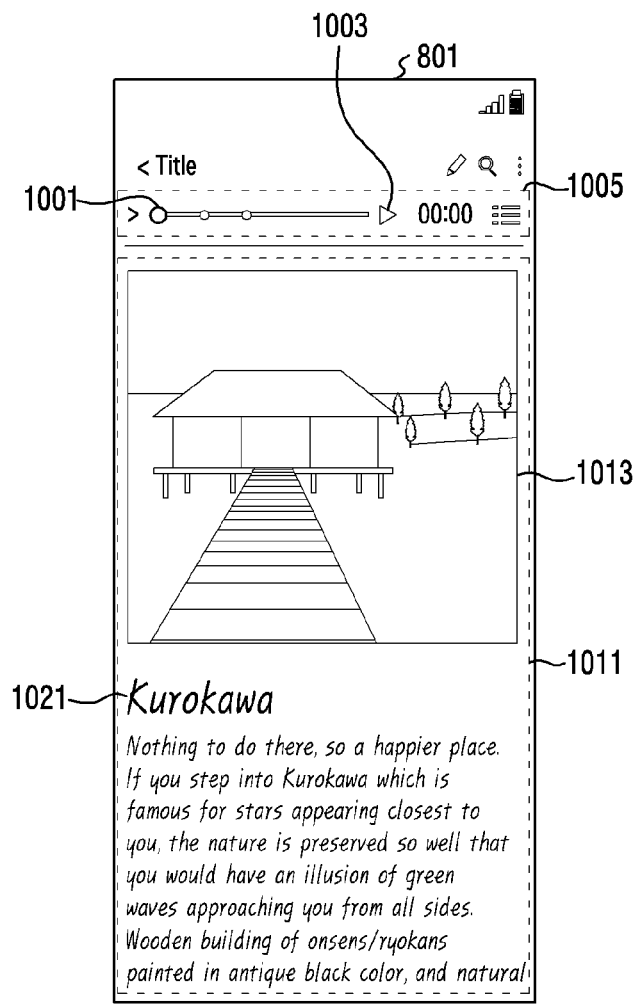
FIG. 10A to FIG. 10D illustrate a UI related to object display using auto scroll while outputting audio according to an embodiment.

FIG. 10A illustrates a first screen 801 displayed before audio data is played. The first screen 801 may include an object 1005 related to audio playback, an input area 1011, and a marking of a search function. The object 1005 related to audio playback may include a marking 1001 indicating an audio playback point and a marking 1003 indicating audio playback, stop, and pause. The electronic device 101 may acquire a text 1021 through the input area 1011, and may display an image 1013 and a text 1021.

According to an embodiment, the electronic device 101 may acquire handwriting data corresponding to a handwriting acquired through the first screen 801. The electronic device 101 may determine a text corresponding to the acquired handwriting data. The electronic device 101 may convert the acquired handwriting data into a text corresponding to the handwriting data. The electronic device 101 may assign a visual effect to the handwriting data or the text and then display the handwriting data or the text.

According to an embodiment, the electronic device 101 may acquire audio data corresponding to audio acquired through the microphone 207. The electronic device 101 may determine audio data corresponding to the acquired audio.

According to an embodiment, the electronic device 101 may acquire a user input for a text search and, in response to the user input, may determine the searched text among texts stored in a handwriting file of a first application. The electronic device 101 may visually display the determined text.

Figure 10B:
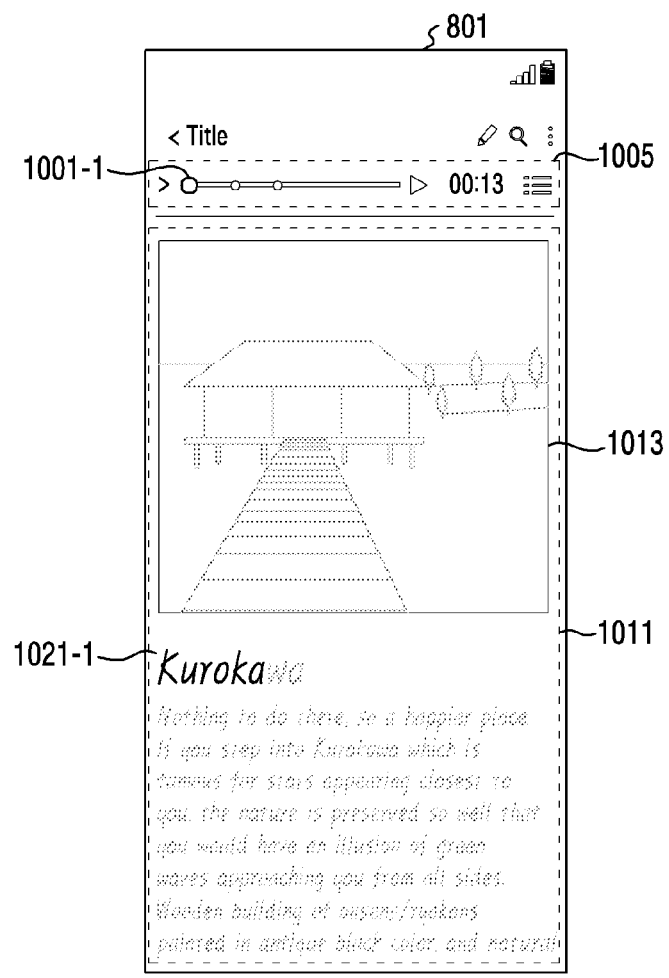

FIG. 10B illustrates the first screen 801 displayed while audio data is played. The object 1005 related to audio playback may indicate a first playback point-in-time 1001-1 (for example, a point-in-time after 13 seconds lapses from the starting time of the audio) of the audio. While the audio is outputted, the electronic device 101 may display a text 1021-1 mapped to the first playback point-in-time 1001-1 of the outputted audio through the first screen 801.

Figure 10C:
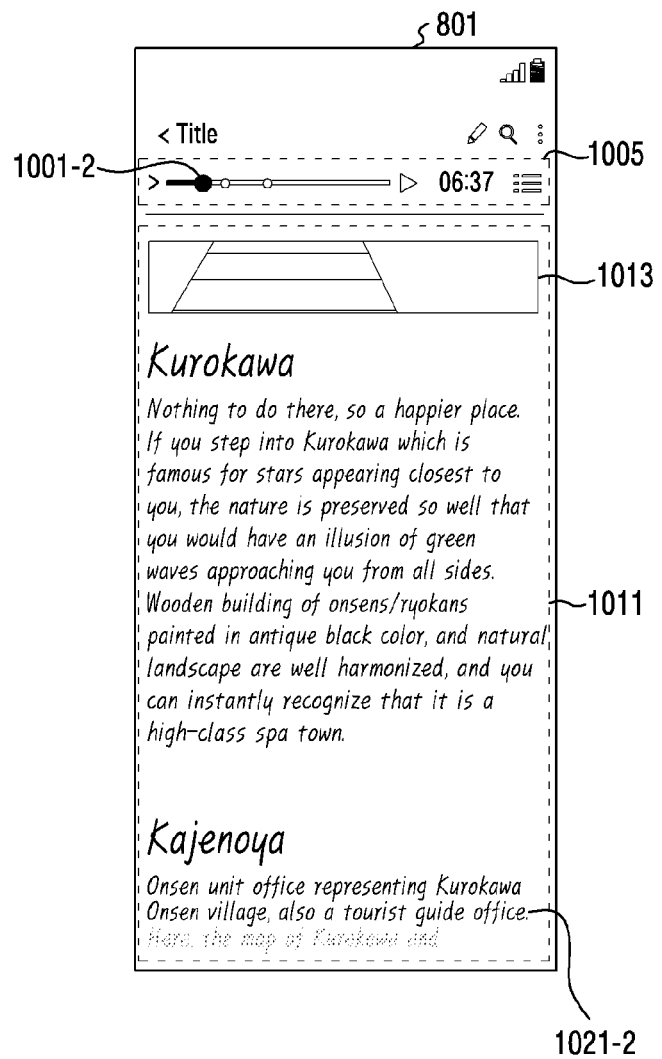

FIG. 10C illustrates the first screen 801 displayed while audio data is played. The object 1005 related to audio playback may indicate a second playback point-in-time 1001-2 (for example, a point-in-time of 6 minutes 37 seconds that lapses from the starting time of the audio) of the audio. While the audio is outputted, the electronic device 101 may determine whether a text 1021-2 mapped to the second playback point-in-time 1001-2 of the outputted audio is displayed on the first screen 801. When the text 1021-2 is not displayed on the first screen 801, the electronic device 101 may convert the screen through auto scroll such that the text 1021-2 is displayed on the first screen 801. For example, the first screen 801 illustrated in FIG. 10B does not display the second text 1021-2 mapped to the second playback point-in-time 1001-2 of the audio, and the electronic device 101 may thus convert the screen to the first screen 801 illustrated in FIG. 10C by using auto scroll such that the second text 1021-2 mapped to the second playback point-in-time 1001-2 of the audio is displayed on the first screen 801.

Figure 10D:
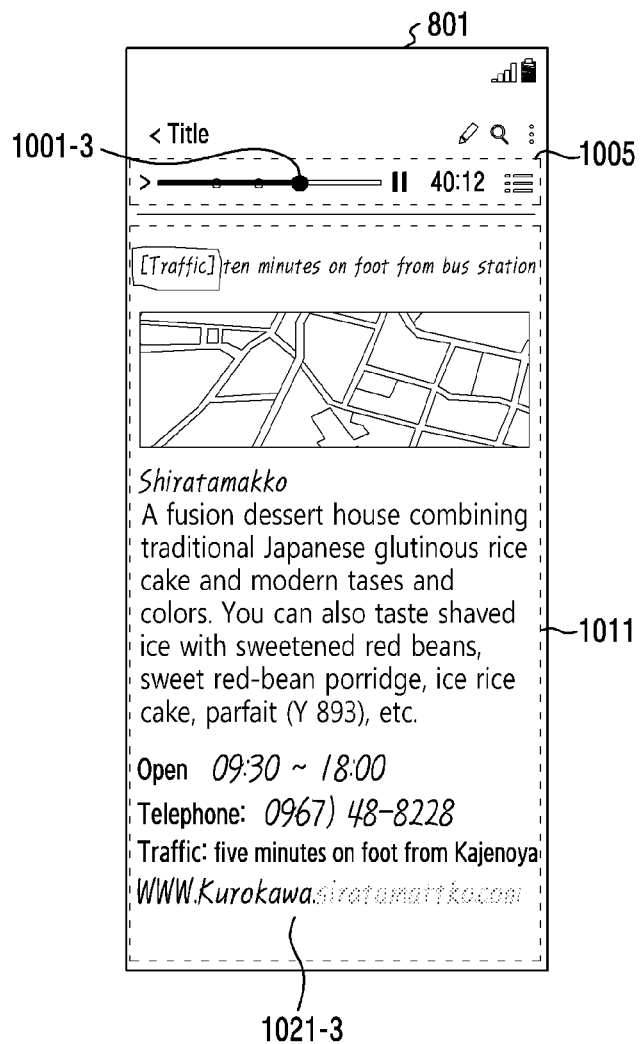

FIG. 10D illustrates the first screen 801 displayed after audio data is played. The object 1005 related to audio playback may indicate a third playback point-in-time 1001-3 (for example, a point-in-time of 40 minutes 12 seconds that lapses from the starting time of the audio) of the audio. While the audio is outputted, the electronic device 101 may determine whether a text 1021-3 mapped to the third playback point-in-time 1001-3 of the outputted audio is displayed on the first screen 801. When the text 1021-3 is not displayed on the first screen, the electronic device 101 may convert the screen through auto scroll such that the text 1021-3 is displayed on the first screen 801. For example, the first screen 801 illustrated in FIG. 10C does not display the third text 1021-3 mapped to the third playback point-in-time 1001-3 of the audio, and the electronic device 101 may thus convert the screen to the first screen 801 illustrated in FIG. 10D by using auto scroll such that the third text 1021-3 mapped to the third playback point-in-time 1001-3 of the audio is displayed on the first screen 801 at the third playback point-in-time 1001-3.

According to an embodiment, the electronic device 101 may determine whether an image displayed in the first screen 801 is associated with an object (for example, text). When content (for example, image and text) of the first application is generated and stored, association between the content (for example, image and text) may be together determined and stored. When the image and the object are associated, the electronic device 101 may fix the image in an area in the first screen 801 and may perform auto scroll with regard to the object, thereby converting the first screen 801. When the image and the object are not associated, the electronic device 101 may perform auto scroll with regard to the image and the object, thereby converting the first screen 801.

Figures 11A, 11B:
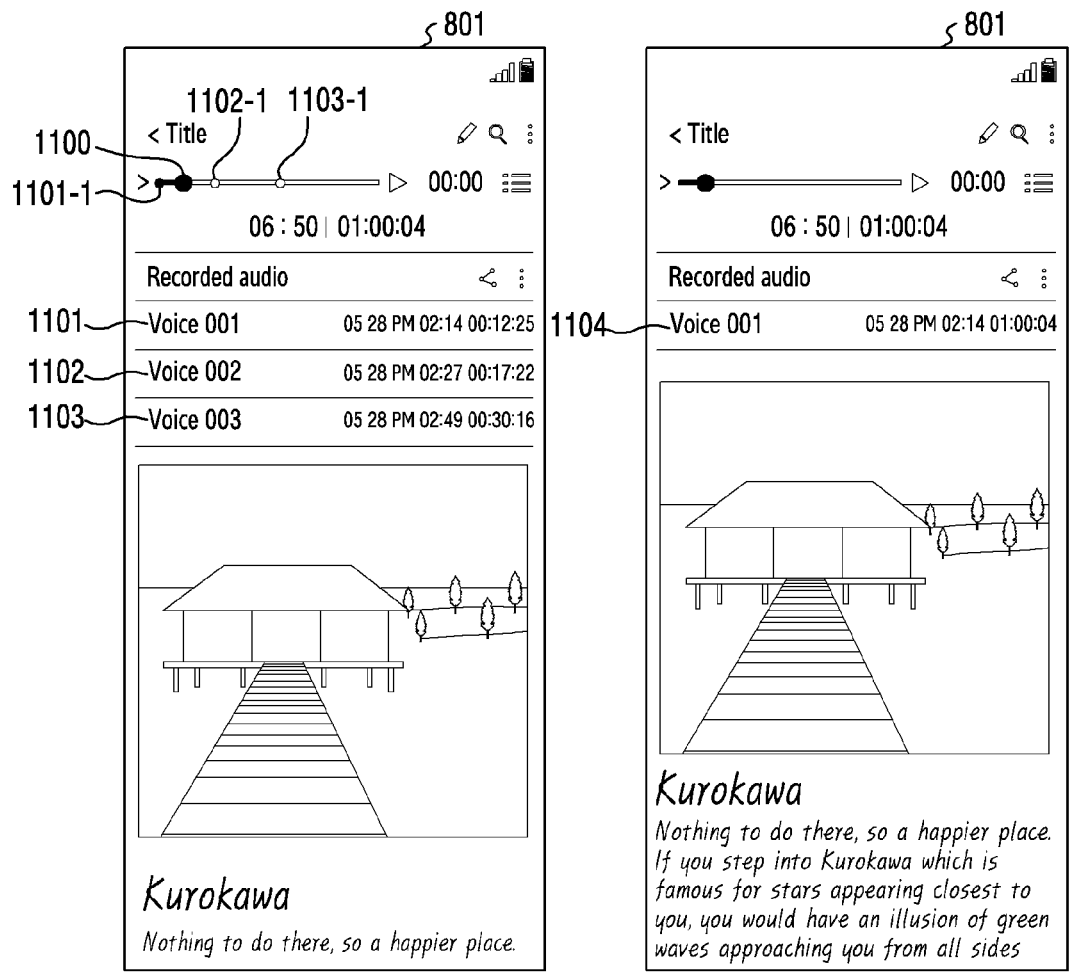
FIGS. 11A and 11B illustrate a UI related to synthesis of playback data according to an embodiment.

FIGS. 11A and 11B illustrate a UI related to synthesis of playback data according to an embodiment.

Referring to FIG. 11A, the electronic device 101 may synthesize multiple pieces of playback data (for example, Voice 001 1101, Voice 002 1102, and Voice 003 1103).

FIG. 11A illustrates a first screen 801 on which multiple pieces of playback data are displayed. The audio playback point 1100 may indicate the current playback point-in-time among the entire playback time of audio data.

According to an embodiment, the first point-in-time 1101-1 may correspond to a point-in-time at which playback of first playback data (for example, Voice 001 1101) starts, the second point-in-time 1101-2 may correspond to a point-in-time at which playback of second playback data (for example, Voice 002 1102) starts, and the third point-in-time 1101-3 may correspond to a point-in-time at which playback of third playback data (for example, Voice 003 1103) starts.

According to an embodiment, the electronic device 101 may acquire a user input for playing playback data. In response to acquisition of the user input, the electronic device 101 may successively play multiple pieces of playback data. For example, in response to acquisition of the user input, the electronic device 101 may successively play first playback data (for example, Voice 001 1101), second playback data (for example, Voice 002 1102), and third playback data (for example, Voice 003 1103).

According to an embodiment, in response to acquisition of an input for selecting a point corresponding to playback data, the electronic device 101 may play the playback data. For example, in response to acquisition of an input for selecting a second point-in-time 1102-1 corresponding to second playback data (for example, Voice 002 1102), the electronic device 101 may play the second playback data.

FIG. 11B illustrates a first screen 801 for displaying a single piece of playback data (for example, Voice 001 1104) obtained by synthesizing multiple pieces of playback data (for example, Voice 001 1101, Voice 002 1102, and Voice 003 1103).

According to an embodiment, the electronic device 101 may acquire a user input for synthesizing playback data. For example, when multiple pieces of playback data (for example, Voice 001 1101, Voice 002 1102, and Voice 003 1103) are stored in a first handwriting file of a first application, a user input for synthesizing the multiple pieces of playback data may be acquired. In response to acquisition of a user input for synthesizing the pieces of playback data, the electronic device 101 may synthesize the multiple pieces of playback data. Synthesis of the pieces of playback data may correspond to conversion of multiple pieces of playback data (for example, Voice 001 1101, Voice 002 1102, and Voice 003 1103) into a single piece of playback data (for example, Voice 001 1104).

Referring to FIG. 11A, when multiple pieces of playback data (for example, Voice 001 1101, Voice 002 1102, and Voice 003 1103) exist in a first handwriting file, the electronic device 101 may respond to a user input for selecting a piece of playback data (for example, Voice 001 1101) from the multiple pieces of playback data, may apply a visual effect (for example, dimming) to content mapped to the piece of playback data (for example, Voice 001 1101), and may display the same accordingly. For example, the electronic device 101 may apply a visual effect to content corresponding to data selected from the multiple pieces of playback data and may apply no visual effect to content corresponding to unselected data.

Referring to FIG. 11B, when a single piece of playback data (for example, Voice 001 1104) into which multiple pieces of playback data (for example, Voice 001 1101, Voice 002 1102, and Voice 003 1103) are synthesized exists in a first handwriting file, the electronic device 101 may respond to acquisition of a user input for selecting the single piece of playback data, may apply a visual effect (for example, dimming) to content mapped to the single piece of playback data (for example, Voice 001 1101), and may display the same accordingly.

According to an embodiment, the electronic device 101 may align time information (for example, information regarding the time during which playback data has been recorded) including the start, pause, resume, and stop of multiple pieces of playback data, thereby combining the same into a single piece of playback data. Based on alignment of the time information, the electronic device 101 may combine multiple pieces of playback data into a single piece of playback data corresponding to a time flow.

According to an embodiment, an electronic device 101 may include: a speaker 203, a touch display 205, and a processor 201 operatively connected to the speaker 203 and the touch display 205. The processor 201 may execute a predetermined software application, display a first screen corresponding to the predetermined software application through the touch display 205 in response to the execution of the predetermined software application, acquire a first input for playing audio data of the predetermined software application while the first screen is displayed, output audio corresponding to the audio data through the speaker 203 in response to the acquisition of the first input, determine whether an object mapped to a playback point-in-time of the outputted audio is displayed in the first screen, and perform auto scroll, when the object is not displayed in the first screen, such that the object is displayed through the first screen while the audio is outputted.

According to an embodiment, the processor 201 of the electronic device 101 may display the object mapped to the playback point-in-time of the outputted audio through the first screen, while the audio is outputted, in response to the performing of the auto scroll.

According to an embodiment, the processor 201 of the electronic device 101 may display the object mapped to the playback point-in-time of the outputted audio through the first screen by using a visual effect.

According to an embodiment, the processor 201 of the electronic device 101 may determine an area including the object mapped to the playback point-in-time of the outputted audio, determine whether the determined area is included in the first screen, and perform the auto scroll, when the determined area is not included in the first screen, such that the determined area is included in the first screen while the audio is outputted.

According to an embodiment, the processor 201 of the electronic device 101 may display the object included in the determined area and mapped to the playback point-in-time of the outputted audio through the first screen, while the audio is outputted, in response to the performing of the auto scroll.

According to an embodiment, the object may include a first object and a second object, and the playback time-point may include a first playback time-point and a second playback time-point, and the processor 201 of the electronic device 101 may display the first object mapped to the first playback point-in-time of the outputted audio through the first screen while the audio is outputted, determine, when the second object mapped to the second playback point-in-time of the outputted audio is not displayed in the first screen, whether the first object and the second object can be displayed in a single screen, and perform the auto scroll, when the first object and the second object can be displayed in a single screen, such that the first screen is converted to a second screen in which the first object and the second object are included.

According to an embodiment, the processor 201 of the electronic device 101 may perform the auto scroll, when the first object and the second object cannot be displayed in a single screen, such that the first screen is converted into a third screen in which the second object is included.

According to an embodiment, the processor 201 of the electronic device 101 may perform the auto scroll, when a part of the object is not displayed in the first screen, such that the object is displayed through the first screen while the audio is outputted.

According to an embodiment, the processor 201 of the electronic device 101 may determine whether the object mapped to the playback point-in-time of the outputted audio exists, determine a position of the object when the object exists, and determine, based on the determined position, whether the object is displayed in the first screen.

According to an embodiment, the object may include a first object and a second object, and the playback time-point may include a first playback time-point and a second playback time-point, and the processor 201 of the electronic device 101 may acquire a user input for fixing the first object mapped to the first playback point-in-time of the outputted audio in a first area of the first screen, display the first object in the first area of the first screen in response to the acquisition of the user input, and perform the auto scroll, when the second object mapped to the second playback point-in-time of the outputted audio data is not displayed in a second area of the first screen, such that the second object is displayed through the second area of the first screen while the audio is outputted.

According to an embodiment, an electronic device 101 may include a microphone 207, a touch display 205, and a processor 201 operatively connected to the microphone 207 and the touch display 205. The processor 201 may execute a predetermined software application, display a first screen corresponding to the predetermined software application through the touch display 205 in response to the execution of the predetermined software application, acquire audio data corresponding to audio acquired through the microphone 207 while the first screen is displayed, acquire object data corresponding to an object mapped to an input point-in-time of the acquired audio through the touch display 205 while the first screen is displayed, identify an event for ending the acquisition of the audio data and the object data, and generate first playback data including the audio data and the object data mapped to the input point-in-time of the audio data in response to identifying the event for ending the acquisition.

According to an embodiment, wherein the object may include a first object and a second object, and the playback data may include first playback data and second playback data, and the processor 201 of the electronic device 101 may display the first object indicating the first playback data and the second object indicating the second playback data in the first screen, acquire a first input for synthesizing the first playback data and the second playback data through the touch display 205, synthesize the first playback data and the second playback data, in response to the acquisition of the first input, thereby generating third playback data, and display a third object corresponding to the third playback data in the first screen.

According to an embodiment, a method for operating an electronic device 101 may include: the operations of executing a predetermined software application, displaying a first screen corresponding to the predetermined software application through a touch display 205 in response to the execution of the predetermined software application, acquiring a first input for playing audio data of the predetermined software application while the first screen is displayed, outputting audio corresponding to the audio data through a speaker in response to the acquisition of the first input, determining whether an object mapped to a playback point-in-time of the outputted audio is displayed in the first screen, and performing auto scroll, when the object is not displayed in the first screen, such that the object is displayed through the first screen while the audio is outputted.

According to an embodiment, the method for operating an electronic device 101 may further include an operation of displaying the object mapped to the playback point-in-time of the outputted audio through the first screen, while the audio is outputted, in response to the performing of the auto scroll.

According to an embodiment, the method for operating an electronic device 101 may further include an operation of displaying the object mapped to the playback point-in-time of the outputted audio through the first screen by using a visual effect.

According to an embodiment, the method for operating an electronic device 101 may further include the operations of determining an area including an object mapped to a playback point-in-time of the outputted audio, determining whether the determined area is included in the first screen, and performing auto scroll, when the determined area is not included in the first screen, such that the determined area is included in the first screen while the audio is outputted.

According to an embodiment, the method for operating an electronic device 101 may further include an operation of displaying an object included in the determined area and mapped to a playback point-in-time of the outputted audio through the first screen, while the audio is outputted, in response to performing of the auto scroll.

According to an embodiment, the method for operating an electronic device 101 may further include the operations of displaying a first object mapped to a first playback point-in-time of the outputted audio through the first screen while the audio is outputted, determining, when a second object mapped to a second playback point-in-time of the outputted audio is not displayed in the first screen, whether the first object and the second object can be displayed in a single screen, and performing the auto scroll, when the first object and the second object can be displayed in a single screen, such that the first screen is converted to a second screen in which the first object and the second object are included.

According to an embodiment, the method for operating an electronic device 101 may further include the operations of determining whether an object mapped to a playback point-in-time of the outputted audio exists, determining a position of the object when the object exists, and determining, based on the determined position, whether the object is displayed in the first screen.

According to an embodiment, the method for operating an electronic device 101 may further include the operations of executing a predetermined software application, displaying a first screen corresponding to the predetermined software application through a touch display 205 in response to the execution of the predetermined software application, acquiring audio data corresponding to audio acquired through a microphone while the first screen is displayed, acquiring object data corresponding to an object mapped to an input point-in-time of the acquired audio through the touch display 205 while the first screen is displayed, identifying an event for ending the acquisition of the audio and the object, and generating playback data including the audio data and the object data mapped to an input point-in-time of the audio data in response to identifying the event for ending the acquisition.

What is claimed is:
1. An electronic device comprising:
a speaker;
a touch display;
a processor; and
memory storing instructions that, when executed by the processor, cause the electronic device to:
display a first execution screen of an application,
acquire an input for playing audio data of the application while the first execution screen is displayed, output audio corresponding to the audio data through the speaker in response to the acquisition of the input, determine whether a handwriting associated with the outputted audio exists while outputting the audio, wherein the handwriting associated with the outputted audio is a handwriting previously input through an input area of the first execution screen corresponding to the application and previously mapped to a playback point-in-time of the outputted audio, determine whether the handwriting is displayed in the first execution screen, based on the determination that the handwriting associated with the outputted audio exists, determine whether an image displayed in the first execution screen is associated with the handwriting, and perform scroll on the first execution screen, when the handwriting is not displayed in the first execution screen, such that the handwriting is displayed through the first execution screen while the audio is outputted, wherein the image is fixed in an area in the first execution screen and the scroll is performed with regard to the handwriting when the image is associated with the handwriting, and the scroll is performed with regard to the handwriting and the image when the image is not associated with the handwriting, and wherein the instructions cause the electronic device to output the audio without displaying the handwriting while the handwriting associated with the outputted audio does not exist.

2. The electronic device of claim 1, wherein the instructions cause the electronic device to display the handwriting mapped to the playback point-in-time of the outputted audio through the first execution screen, while the audio is outputted, in response to the performing of the scroll.

3. The electronic device of claim 2, wherein the instructions cause the electronic device to display the handwriting mapped to the playback point-in-time of the outputted audio through the first execution screen by using a visual effect.

4. The electronic device of claim 1, wherein the instructions cause the electronic device to:
determine an area comprising the handwriting mapped to the playback point-in-time of the outputted audio,
determine whether the determined area is included in the first execution screen, and
perform the scroll, when the determined area is not included in the first execution screen, such that the determined area is included in the first execution screen while the audio is outputted.

5. The electronic device of claim 4, wherein the instructions cause the electronic device to display the handwriting included in the determined area and mapped to the playback point-in-time of the outputted audio through the first execution screen, while the audio is outputted, in response to the performing of the scroll.

6. The electronic device of claim 1, wherein the handwriting includes a first handwriting and a second handwriting, and the playback point-in-time includes a first playback point-in-time and a second playback point-in-time,
wherein the instructions cause the electronic device to:
display the first handwriting mapped to the first playback point-in-time of the outputted audio through the first execution screen while the audio is outputted,
determine, when the second handwriting mapped to the second playback point-in-time of the outputted audio is not displayed in the first execution screen, whether the first handwriting and the second handwriting are capable to be displayed in a single screen, and
perform the scroll, when the first handwriting and the second handwriting are capable to be displayed in a single screen, such that the first execution screen is converted to a second execution screen in which the first handwriting and the second handwriting are included.

7. The electronic device of claim 6, wherein the instructions cause the electronic device to perform the scroll, when the first handwriting and the second handwriting are not capable to be displayed in a single screen, such that the first execution screen is converted into a third execution screen in which the second handwriting is included.

8. The electronic device of claim 1, wherein the instructions cause the electronic device perform the scroll, when a part of the handwriting is not displayed in the first execution screen, such that the handwriting is displayed through the first execution screen while the audio is outputted.

9. The electronic device of claim 1, wherein the instructions cause the electronic device to:
determine whether the handwriting mapped to the playback point-in-time of the outputted audio exists,
determine a position of the handwriting when the handwriting exists, and
determine, based on the determined position, whether the handwriting is displayed in the first execution screen.

10. The electronic device of claim 1, wherein the handwriting includes a first handwriting and a second handwriting, and the playback point-in-time includes a first playback point-in-time and a second playback point-in-time,
wherein the instructions cause the electronic device to:
acquire a user input for fixing the first handwriting mapped to the first playback point-in-time of the outputted audio in a first area of the first execution screen,
display the first handwriting in the first area of the first execution screen in response to the acquisition of the user input, and
perform the scroll, when the second handwriting mapped to the second playback point-in-time of the outputted audio data is not displayed in a second area of the first execution screen, such that the second handwriting is displayed through the second area of the first execution screen while the audio is outputted.

11. A method for operating an electronic device, the method comprising:
displaying a first execution screen of an application;
acquiring an input for playing audio data of the application while the first execution screen is displayed;
outputting audio corresponding to the audio data through a speaker in response to the acquisition of the input;
determining whether a handwriting associated with the outputted audio exists while outputting the audio, wherein the handwriting associated with the outputted audio is a handwriting previously input through an input area of the first execution screen corresponding to the application and previously mapped to a playback point-in-time of the outputted audio;
determining whether the handwriting is displayed in the first execution screen, based on the determination that the handwriting associated with the outputted audio exists;

determining whether an image displayed in the first execution screen is associated with the handwriting; and performing scroll on the first execution screen, when the handwriting is not displayed in the first execution screen, such that the handwriting is displayed through the first execution screen while the audio is outputted, wherein the image is fixed in an area in the first execution screen and the scroll is performed with regard to the handwriting when the image is associated with the handwriting, and the scroll is performed with regard to the handwriting and the image when the image is not associated with the handwriting, and wherein while the handwriting associated with the outputted audio does not exist, the audio is output without displaying the handwriting.

12. The method of claim 11, further comprising displaying the handwriting mapped to the playback point-in-time of the outputted audio through the first execution screen, while the audio is outputted, in response to the performing of the scroll.

13. The method of claim 12, further comprising displaying the handwriting mapped to the playback point-in-time of the outputted audio through the first execution screen by using a visual effect.

14. The method of claim 11, further comprising:
determining an area comprising the handwriting mapped to the playback point-in-time of the outputted audio;
determining whether the determined area is included in the first execution screen; and
performing the scroll, when the determined area is not included in the first execution screen, such that the determined area is included in the first execution screen while the audio is outputted.

15. The method of claim 14, further comprising displaying the handwriting included in the determined area and mapped to the playback point-in-time of the outputted audio through the first execution screen, while the audio is outputted, in response to the performing of the scroll.

16. The method of claim 11, wherein the handwriting includes a first handwriting and a second handwriting, and the playback point-in-time includes a first playback point-in-time and a second playback point-in-time, the method further comprising:
displaying the first handwriting mapped to the first playback point-in-time of the outputted audio through the first execution screen while the audio is outputted;
determining, when the second handwriting mapped to the second playback point-in-time of the outputted audio is not displayed in the first execution screen, whether the first handwriting and the second handwriting are capable to be displayed in a single screen; and
performing the scroll, when the first handwriting and the second handwriting are capable to be displayed in a single screen, such that the first execution screen is converted to a second execution screen in which the first handwriting and the second handwriting are included.

* * * * *